Jan. 9, 1968  JEAN-MARIE MASSOUBRE  3,362,793
BACK FLOW-PREVENTING REACTOR FOR CONTINUOUS POLYMERIZATION
Filed June 17, 1964

INVENTOR
JEAN-MARIE MASSOUBRE
BY
Brumbaugh, Free, Graves & Donohue
HIS ATTORNEYS

# United States Patent Office 3,362,793
Patented Jan. 9, 1968

3,362,793
BACK FLOW-PREVENTING REACTOR FOR
CONTINUOUS POLYMERIZATION
Jean-Marie Massoubre, Clermont-Ferrand, France, assignor to Compagnie Generale des Etablissements Michelin, raison sociale Michelin & Cie, Clermont-Ferrand, Puy-de-Dome, France
Filed June 17, 1964, Ser. No. 375,862
3 Claims. (Cl. 23—285)

ABSTRACT OF THE DISCLOSURE

An improvement in a reactor for continuous polymerization which includes a cylindrical reaction chamber having at one end a mixing chamber containing a high-speed rotor for mixing reagents introduced into the mixing chamber prior to their flow into the one end of the reaction chamber, the reaction chamber including a centrally located roller and at least two other rollers interposed between the first roller and the wall of the reaction chamber and in wiping contact therewith, the first roller and other rollers being interconnected by means of a planetary gear system which causes the rollers to rotate relative to each other and to the wall of the reaction chamber in rolling and wiping engagement with the reaction chamber and each other, the reagent flowing through channels between and defined by the rollers and the wall of the reaction chamber and being discharged through an outlet at the opposite end of the reaction chamber from the mixing chamber.

---

Figure 1:
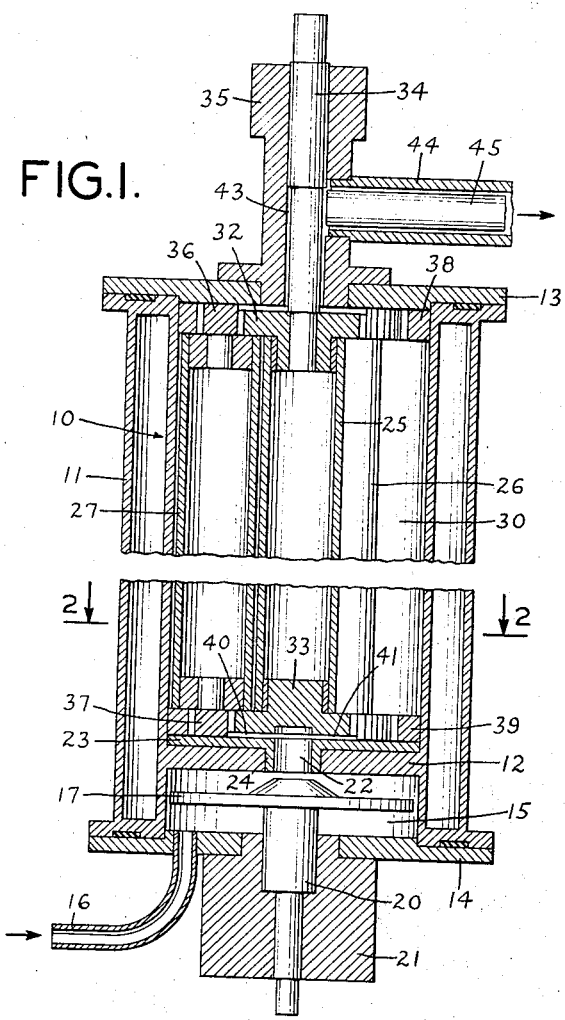

This invention relates to the production of polymers such as, for example, polyurethane, polystyrene, polybutadiene, polyisoprene, polyisopropylene and the like and, more particularly, to methods and apparatus for promoting polymerization in a uniform and systematic manner.

Polymerization reactions are generally of an evolutionary or progressive character in which the reaction takes place over a period of time leading to the formation of the macromolecules, regardless of whether the reactions produce polyadditions or polymerization proper. The reactions are conducted, depending upon the polymer produced, in mass, in solution or in emulsion.

Despite the fact that the polymerization reactions are evolutionary, many continuous operations are conducted in a mixer type of reactor in which components in a more advanced state of polymerization are mixed with reagents or components in a less advanced state of polymerization with the result that the product being discharged contains polymers in different stages or states of polymerization.

Attempts have been made to produce a more uniform product by passing the reagents through a reaction chamber generally of tubular shape in the hope that no retrograde or back flow movement of the components will occur and cause mixing or diffusion of the polymers in a more advanced state with the incoming reagents or polymers in a less advanced state. However, even in such reactors the flow is disturbed as a result of the frictional or retarding effect of the walls of the cylinder so that the portion of the reactants adjacent the walls moves more slowly than the reactants spaced at a distance from the walls. For that reason, some of the reactants approaching a state of complete polymerization remain in the reactor longer than intended and a crust or layer is formed on the walls. Scraping of the walls with scrapers in the reaction chamber does not help very much for the reason that deposits are formed on the scrapers with the result that in time, the working volume of the reactor is greatly reduced and the reactor may become completely clogged.

In accordance with the present invention, a reactor and a method are provided by means of which flow of reagents and the polymerization reactants is uniform, mixing or diffusing of the reactants in various stages of polymerization is minimized and a continuous systematic and uniform type of reaction takes place with the result that a more uniform product is obtained. Moreover, in the new reactor, retrograde or back flow of the reagents is overcome and deposits on the walls of the reaction chamber and other elements therein are reduced to a minimum.

A typical reactor embodying the invention includes a cylindrical tube or reaction chamber which contains a plurality of rollers which serve to divide the tank into a series of channels extending from end to end of the tank for flow of the reagents and polymerization products therethrough. The rollers are mounted so that they rotate relative to each other and to the wall of the chamber with a wiping motion so that the surfaces of the rollers and the surfaces of the reaction chamber are wiped and swept continuously to avoid the building up of deposits thereon. Due to the unobstructed nature of the channels, the products flow from one end of the channels to the other without interference and at a substantially uniform rate throughout the cross section of the columns in the channels thereby avoiding any back flow or retrograde flow of the reactants undergoing polymerization in the channels. In accordance with the method, the continuous flow and wiping of the surfaces coact to prevent accumulation of deposits and mixing of the reactants in different states of polymerization and produce a uniform polymerized product.

Figure 2:
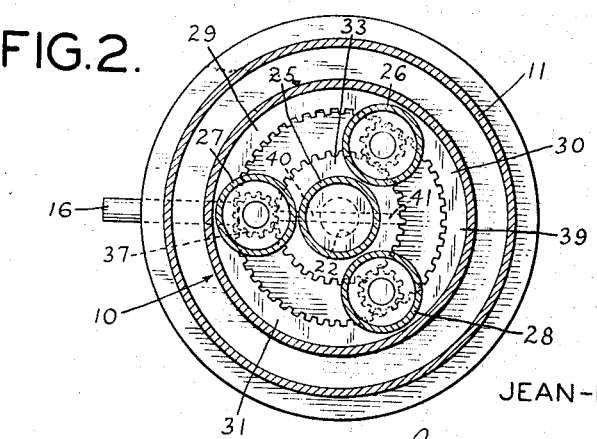

For a better understanding of the present invention, reference may be had to the accompanying drawing in which FIGURE 1 is a view in vertical section through a typical reactor embodying the present invention; and FIGURE 2 is a view in cross section taken on line 2—2 of FIGURE 1.

The reactor chosen for purposes of illustration includes a cylindrical tank or chamber 10 having a heat-exchanging jacket 11 therearound and extending at one end beyond the bottom 12 of the chamber 10. The upper end of the chamber is closed by means of a removable cover 13. A cover 14 engages the end of the heat-exchanging jacket 11 and forms a mixing chamber 15 between the bottom 12, the cover 14 and the jacket 11.

Reagents to be polymerized or otherwise reacted are introduced into the mixing chamber 15 through one or more pipes 16 where they come into contact with a mixing rotor 17 having its edge closely spaced with respect to the inner wall of the heat-exchanging jacket 11. A shaft 20 mounted in a bearing or bushing 21 carried by the end plate 14 carries the rotor at its upper end and is driven at high speed, for example, 400 r.p.m. by means of a suitable motor (not shown). The rotor 17 may be disklike in shape or may be provided with teeth or other suitable agitating elements in order to assure mixing of the reagents entering the mixing chamber 15.

The mixture of reagents flows upwardly through a central opening 22 in the bottom 12 of the reaction chamber 10. A liner 23 which extends across the bottom 12 of the reaction chamber, has a downwardly extending tubular portion 24 defining the opening 22.

Within the reaction chamber 10 are a plurality of solid or hollow rollers 25, 26, 27 and 28. More or fewer than three rollers 26, 27 and 28 may be mounted within the reaction chamber and are spaced symmetrically from each other around the axis of the chamber 10. As best seen in FIGURE 2, the roller 25 is coaxial with the chamber 10 and the rollers 26, 27 and 28 have their axes parallel with the roller 25 and are of a diameter such as to span the space between the inner surface of the reaction chamber 10 and the outer periphery of the roller 25. The rollers 26, 27 and 28 are in or substantially in rolling or wiping engagement with the wall of the reaction chamber and the periphery of the roller 25 and divide the reaction chamber into a series of separate lengthwise extending channels 29, 30 and 31.

Sun gears 32 and 33 are fixed to opposite ends of the roller 25 and these gears and the roller 25 are driven by means of a shaft 34 mounted in a bearing 35 carried by and extending from the cover plate 13. At opposite ends of the rollers 26, 27 and 28 are planet gears 36 and 37 which mesh with the sun gears 32 and 33 and also with the orbital or internal gears 38 and 39 fixed at the opposite ends of the reaction chamber 10. Upon rotation of the shaft 34 by a motor (not shown) the roller 25 will rotate and cause the rollers 26, 27 and 28 to roll along the internal gears 38 and 39 and wipe against and rotate relatively to the central roller 25 and the walls of the chamber 10 with the result that all of the exposed surfaces are wiped and kept clean. Operation of the reactor can be continued over very long periods of time without clogging or collection of deposits therein. At the same time, the upward flow of reactants is not disturbed and little, if any, turbulence is produced except that preventing the stagnation of the reactants on the exposed surfaces with which the reactants come into contact.

Flow of the mixture of reagents from the passage 22 into the channels 29 to 31 is accomplished by forming generally radially extending passages 40 and 41 in the undersurface of the sun gear 33 and disposing these passages so that at least one end of each passage will be in open communication with at least one of the channels 29 to 31 regardless of the positions of the rollers 26 to 28. Thus, for example, as shown in FIGURE 2, the passages 40 and 41 are spaced about 180° apart while the rollers and gears are disposed about 120° apart. The angular relation of the passages and the rollers can, of course, be varied depending upon the number of the rollers and the passages.

The polymer is discharged from the top of the chamber through passages in upper surface of the gear 32 or, as shown, through a space between the upper surface of the gear and the cover 13. In this way, the polymer can flow behind the gear and upwardly through the passage 43 around the drive shaft 34 and out through the laterally extending conduit 44 which is provided with a high speed rotor 45 driven by a suitable motor to facilitate the discharge of the polymer without back flow. To that end, the rotor 45 may be provided with blades or fins which serve to pump and withdraw the mixture.

From the preceding description, it will be clear that the reagents are thoroughly mixed in the mixing chamber 15 by means of the rotor 17 and the mixture is then discharged through the passages 22, 40 and 41 into the channels 29, 30 and 31 in the reaction chamber. While the channels move around the axis of the chamber 10, due to the rotary displacement of the rollers 26, 27 and 28 within the reaction chamber and around the roller 25, nevertheless the mixture progresses lengthwise of these channels with little disturbance or agitation and avoiding diffusion or mixing of the mixture of polymers in different stages of polymerization. Moreover, the constant wiping of the walls of the reaction chamber and the rollers prevents stagnation of the polymers and aids in discharging them from the reaction chamber without retrograde or back flow movement.

While the reactor has been described with respect to the use of a central roller and planet rollers in the reaction chamber, it will be understood that the central roller can be omitted and the outer rollers enlarged in diameter so that they contact each other as well as the wall of the reaction chamber. Moreover, the reaction chamber can have an inner surface shaped as almost any desired surface of revolution and contain rollers conforming to the surface but in order to minimize turbulence, cylindrical rollers and a cylindrical reaction chamber are preferred. Also, the reaction chamber 10 can be rotated, if desired, to produce the desired relative movement of the chamber and the rollers.

Accordingly, inasmuch as the reactor is susceptible to considerable modification, the form of reactor described above should be considered as illustrative and the invention should be considered as limited only as defined in the following claims.

I claim:

1. A reactor for systematic polymerization comprising a reaction chamber having a wall having an inner surface formed as a surface of revolution and opposite ends, a first roller extending substantially axially of said chamber, at least two other rollers in substantially rolling engagement with said first roller and said inner surface, said other rollers being symmetrically spaced from each other around said first roller to form a plurality of channels between said first and other rollers and said inner surface, planetary gear means for rotating said rollers and said inner surface relatively to wipe said inner surface and said rollers, means for introducing a reaction mixture through said gear means at one end of said reaction chamber for flow through said channels for reaction therein, means for discharging the reaction product from the channels at the other end of said reaction chamber said means for introducing said reaction mixture comprising a mixing chamber communicating with one end of said reaction chamber and having an internal surface, a rotor in said mixing chamber in closely spaced relation to said internal surface, means for rotating said rotor at high speed and an inlet for introducing reagents into said mixing chamber.

2. The reactor set forth in claim 1 in which said means for introducing and means for discharging said mixture comprise openings in said reaction ends of said chamber coaxial with said first roller and passages between said opposite ends of said reaction chamber and the ends of said first roller communicating at all times with at least one of said channels and said openings.

3. The reactor set forth in claim 1 in which said means for rotating said rollers and said inner surface relatively comprise sun gears fixed to opposite ends of said first roller, internal gears fixed relative to said wall at its opposite ends, planet gears fixed to opposite ends of said other rollers and meshing with said sun and internal gears at opposite ends of said first roller and wall, openings in said ends of said chamber coaxial with said first roller and passages between said sun gears and said opposite ends of said chamber communicating at all times with at least one of said channels and with said openings.

References Cited

UNITED STATES PATENTS 2,238,864   4/1941   Pratt et al. _____ 23—285 XR
3,215,506   11/1965  Keil et al. _____ 23—285

JAMES H. TAYMAN, JR., *Primary Examiner.*

DONALD E. CZAJA, *Examiner.*

J. J. KLOCKO, *Assistant Examiner.*